June 25, 1957 — T. A. BEAZLEY — 2,797,111
FITTING FOR PLURAL LAYER WIRE REINFORCED HOSES
Filed April 2, 1953 — 2 Sheets-Sheet 1
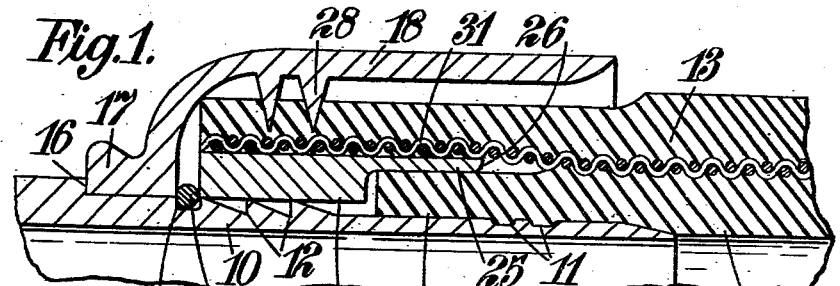
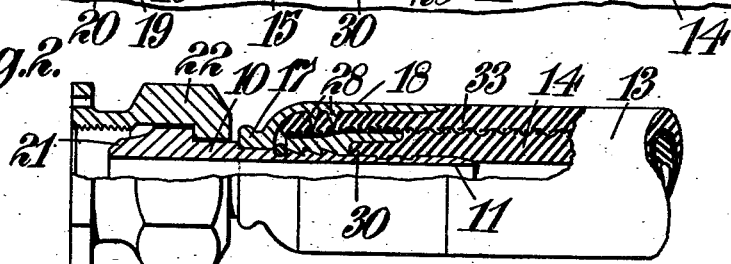
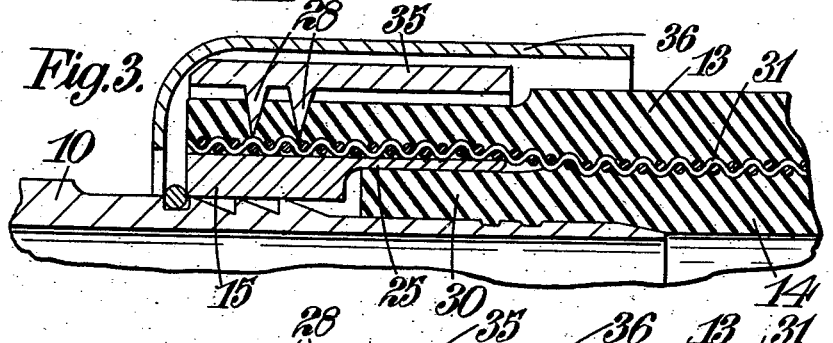
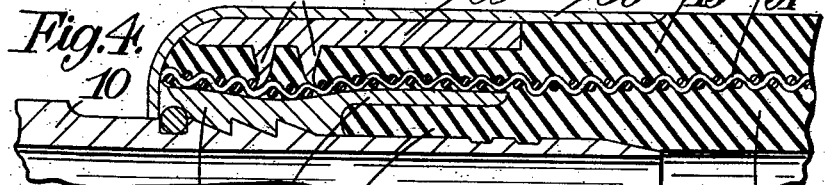
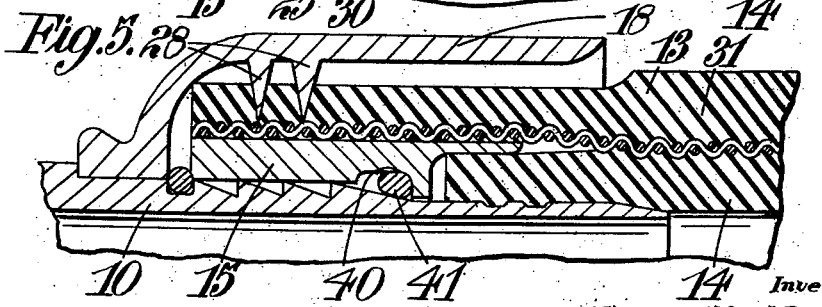
Inventor
Thomas Alfred Beazley June 25, 1957  T. A. BEAZLEY  2,797,111
FITTING FOR PLURAL LAYER WIRE REINFORCED HOSES
Filed April 2, 1953  2 Sheets-Sheet 2
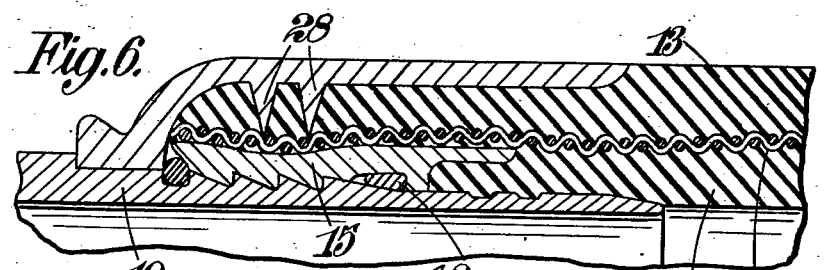
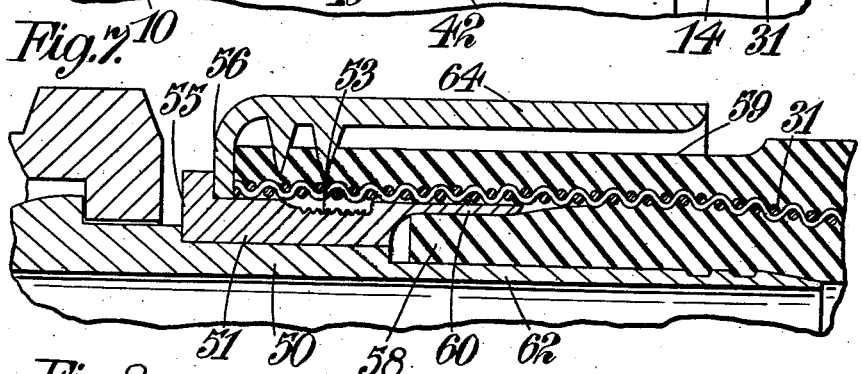
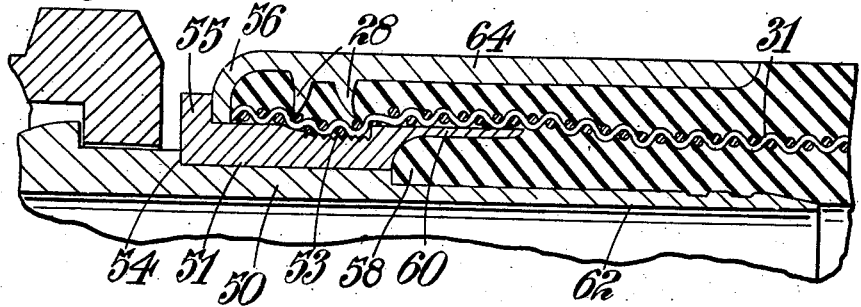
*Inventor*
*Thomas Alfred Beazley*

United States Patent Office 2,797,111
Patented June 25, 1957

2,797,111

FITTING FOR PLURAL LAYER WIRE REINFORCED HOSES

Thomas Alfred Beazley, London, England, assignor to British Tyre & Rubber Company Limited, London, England, a British company Application April 2, 1953, Serial No. 346,419

Claims priority, application Great Britain April 7, 1952

4 Claims. (Cl. 285—149)

The invention relates to hose end units of the type (herein referred to as the type described) embodying a length of hose consisting of a tube of rubber or like flexible material (e. g. a suitable plastic) or embodying such a tube as a lining and a hose end fitting (e. g. incorporating a coupling member) fastened to the end of the hose length and in which a fluid-tight seal between the hose and the fitting is obtained by means of an annular flap formed by a portion of the tube at the end thereof which flap bears against a surrounding internal surface on the fitting and is, or may be, urged outwardly into pressure engagement therewith by the fluid pressure within the hose. The invention is particularly, but not exclusively, concerned with such units in which the hose is of the kind incorporating a braided, plaited or like reinforcement, usually of wire, between an outer cover of rubber or other flexible material and an inner lining tube of natural or synthetic rubber or of a flexible plastic. When the hose is of this kind the inner lining tube may readily be employed to provide the flap and the reinforcement with or without the outer cover may be used for securing the fitting to the hose. Thus the fitting may be secured by gripping a portion of the reinforcement without intervening cover or lining material.

The present invention has for its object the provision of a hose end unit of the type described in which a particularly effective fluid-tight seal is obtained.

A further object of a preferred form of the invention is to provide particularly effective and convenient means for securing an end fitting to hose of the kind above described in which there is a wire reinforcement embodied in the hose.

The invention consists in a hose end unit of the type described characterised by the feature that the flap has an initial pressure engagement with the said surrounding surface produced by radial compression of the material of the flap between said surface and a member within the flap.

In one construction of the unit according to the invention, the member aforesaid within the flap is a tubular insert fitted into the mouth of the hose.

An arrangement which provides a particularly effective seal is one in which the surrounding surface and the member within the flap together provide an annular pocket within which the flap is received and gripped, which pocket is closed around the free end of the flap. The surrounding surface may be provided by a sealing member surrounding in spaced relation a tubular insert and secured thereto.

When the invention is applied to hose of the kind embodying wire reinforcement as described above there may be provided a ferrule fitted over the end of the hose and constructed to grip the wire, without intervening cover or lining material, against the insert or an intermediate member secured thereto and it is preferred that this ferrule, or a lining member, has one or more internal projections which cut through the hose cover to the reinforcement and clamp the wire against the insert or the intermediate member. The projections may be in the form of a screw thread constructed to screw on to the hose cover and in so doing to cut through the material of the cover.

Four specific constructions of hose end units according to the invention and embodying coupling members will now be described by way of example and with reference to the drawings in which:

Figure 1 is a part section through one of the coupling units showing the parts assembled ready for the final swaging step.

Figure 2 is a part section, part elevation, of the coupling unit shown in Figure 1 after swaging, Figure 3 is a part section showing a modified form of the coupling unit shown in Figures 1 and 2, before swaging, Figure 4 shows the modified unit after swaging, Figure 5 is a view similar to Figure 1 of a third form of coupling unit, Figure 6 is a part section of the coupling unit shown in Figure 5 after swaging, and Figures 7 and 8 are views similar to Figures 5 and 6 of the fourth form of coupling.

In the example shown in Figures 1 and 2 the insert 10 is of tubular form and is provided with two sets of circumferential grooves 11 and 12. The set of grooves 11 is near the inner end of the insert (i. e. the end which is introduced into the hose 13) and these grooves are intended to assist in the grip of the insert on the inner lining 14 of the hose. The set of grooves 12 is intermediate in the length of the insert and is intended for reception of the part of the material of the sleeve 15 when it is deformed as later described. There is also a step 16 near to the outer end of the insert to form an abutment for an inturned flange 17 on the outer end of a ferrule 18. A spring ring or circlip 19 fitted in a groove 20 behind this abutment is provided to retain the flange in position. At the outer end the insert is formed as a union nipple 21 which is surrounded by a union nut 22.

The sleeve 15 is of soft material such as aluminium or soft brass and initially is a sliding fit over the insert 10. This sleeve has at its inner end an extension 25 which is spaced away from the insert and is curved outwardly to a sharp edge 26 at the end of the extension. This extension constitutes the aforesaid sealing member.

The ferrule 18 which is of steel, brass, aluminium, or other suitable material is of tubular form. The inturned flange 17 at its outer end is initially free to slide over the insert and during the swaging operation is contracted onto the insert betwen the step 16 and the circlip 19. Adjacent its outer end the ferrule is formed with a sharp-edged internal screw-thread 28. The thread is backed off at its ends and the start is sharp to assist in cutting into the hose cover.

In the assembly of the fitting on to the hose a portion of the hose lining 14 is removed at the end of the hose and a portion 30 at the end of the remainder of the lining is separated from the reinforcement 31 but not removed. The sleeve 15 is then inserted into the mouth of the hose, the sealing member 25 being fitted between the reinforcement 31 and the separated part 30 of the lining which part forms an annular sealing flap. The ferrule 18 containing the circlip 19 is screwed on to the outside of the hose end. In the operation of screwing the ferrule onto the hose the thread 28, on the inside of the ferrule cuts into the hose covering down to the reinforcement 31. The insert 10 is then pushed through the ferrule and circlip into the hose until the step 16 abuts against the flange 17 and the circlip contracts into the groove 20. This tends to expand the flap 30 and so to effect an initial compression of the flap against the sealing member 25. Finally the ferrule is contracted by a swaging operation which forces the threads 28 to grip the reinforcement against the sleeve 15. In addition the sleeve 15 is caused to contract and to be deformed into the grooves 12 in the insert. Consequently the reinforcement is tightly held between the threads 28 and the sleeve 15 and a positive seal closing the outer end of the space between the insert and the sealing member preventing leakage along the insert between the sleeve and the insert is provided. Further, the body of the end of the hose is gripped between the ferrule and the insert in the region 33 and in addition the sealing flap 30 at the end of the lining is gripped under radial pressure between the sealing member 25 and the insert and any leakage along the insert will apply further pressure urging the sealing flap outwardly into increased pressure engagement with the sealing member 25. The grip on the flap 30 arises in part from the aforesaid initial compression, in part from reduction in diameter of the sealing member 25 by the swaging process and in part from the fact that compression of the lining tube in the region 33 between the ferrule and the insert causes some lateral flow of the material of the tube into the pocket between the sealing member and the insert.

In a modified form of the above example shown in Figures 3 and 4 the threads 28 are provided on a liner 35 which fits within the ferrule 36 and is screwed into position on the hose, as shown in Figure 3, before the ferrule is fitted. The sleeve 15 may be inserted into the hose either before or after the liner has been screwed on.

The example shown in Figures 5 and 6 constitutes a further modification of that described with reference to Figures 1 and 2, designed to provide even greater resistance to leakage along the insert, between the insert and the sleeve. In this example the sleeve is formed with an internal groove 40 into which there is fitted a rubber ring 41, the ring when in the free state being of round cross-section. The ring is placed in the groove before the insert is pushed into the sleeve. When the insert has been pushed home the ring is distorted more or less to the form shown in Figure 5. After the swaging operation the ring is further distorted as indicated in Figure 6 and provides a pressure seal against the sleeve and the insert. Furthermore fluid pressure acting, in use, on the inner end face 42 of the ring tends to force it, by reason of its wedge form, into still tighter sealing engagement.

Figures 7 and 8 show a construction of coupling unit which is preferred for particularly onerous conditions. In this example the insert 50 is of steel and the sleeve 51, which is also of steel, is brazed to the insert before assembly. The sleeve and insert may, however, be of integral construction. The sleeve is provided with annular ribs 53 which provide an effective grip on the reinforcement 31 in the final assembly. In this connection it should be appreciated that, the sleeve being, in this example, of steel, the swaging step will not force the reinforcement into a flat surface of the sleeve as in the previous example in which the sleeves are of softer material.

The insert has a step 54 which abuts against the end of the sleeve and the latter has a flange 55 which abuts against the flange 56 on the ferrule.

The method of assembly of this construction of coupling unit is as follows. A portion of the inner tube is removed from the end of the hose length to bare the inside of the reinforcement. A tubular tool is then inserted into the mouth of the hose length to separate the end portion 58 of the lining from the reinforcement, this separated portion providing the sealing flap in the final assembly. The tool is removed and replaced by a supporting mandrel and the surface of the outer cover is ground to reduce it to a determinate thickness and to provide a smooth even surface, as indicated at 59. The ferrule is then screwed onto the outside of the hose. The supporting mandrel is removed and a stepped tubular mandrel representing the sleeve 51 and sealing member 60 is inserted into the hose into the position occupied by the sleeve and sealing member in the final assembly. A tapered mandrel is threaded through the tubular mandrel. This mandrel has a larger diameter equivalent to that of the part 62 of the insert 50 which enters the tube in the final assembly and so compresses the rubber of the flap 58 lying in the space between the part 62 and the sealing member 60, this space being slightly narrower than the thickness of the lining tube constituting the flap. The whole of the temporary assembly thus produced is then cooled to a temperature (e. g. —20° to —50°) such that the rubber temporarily loses its resilience or its rate of recovery is much reduced, and while the rubber is in this state the two mandrels are removed and replaced by the unit consisting of the insert 50 and sleeve 51. The insertion of the unit is facilitated by the fact that the rubber flap has been deformed to a size that will enter the space between the parts 62 and the sealing member 60 and retains that size, due to the cooling. After assembly the rubber is allowed to return to normal temperature when the flap tends to expand to its thickness before compression and so to apply sealing pressure against the part 62 and the sealing member 60. Finally the ferrule 64 is swaged to reduce its diameter and so to cause the threads 28 to grip the reinforcement against the ribs 53, to cause the sealing member 60 to be slightly reduced in diameter thereby to apply further pressure to the rubber 58, and also to grip the hose against the inner end of the insert. The last also causes some flow of rubber laterally into the space between the sealing member 60 and the insert so still further increasing the sealing pressure.

In each of the above described constructions the flap provided by the end of the hose lining tube is compressed between the insert and the sealing member thereby providing an initial sealing pressure. Furthermore any leakage of fluid along the insert between the insert and the lining tube expands the tube into still higher pressure engagement with the sealing member.

The invention is not restricted to the detailed constructional features described in the above examples. For instance the sealing flap may be constituted by only a portion of the thickness of the lining tube. Furthermore the radial compression may be produced solely by the above-mentioned lateral flow of the rubber into the space between the sealing member or other surrounding surface and the insert or other member within the flap.

I claim:

1. A hose end unit comprising a length of hose having inner and outer flexible layers and a wire reinforcement between the layers, said outer layer extending beyond the inner layer, an inner sleeve within the inner layer, said inner sleeve having radial gripping members at one end and gripping teeth extending radially outwardly therefrom at the opposite end, an intermediate sleeve overlying the inner sleeve in engagement with the gripping teeth and having a radially inwardly depressed portion over the gripping teeth, said intermediate sleeve having a recessed portion remote from the depressed portion receiving and clamping the inner layer of the hose between the inner sleeve and the wall of said recessed portion, an outer sleeve surrounding the outer hose layer and extending axially above the intermediate sleeve over substantially its entire length and sharp edged screw-thread-like teeth extending radially inwardly from the outer sleeve above the depressed portion on the intermediate sleeve engaging the reinforcing wire directly between said teeth and the intermediate sleeve and exerting pressure on the outer layer and intermediate sleeve deforming the reinforcing wire into the depressed portion of the intermediate sleeve and clamping the inner flexible layer between the inner sleeve and the wall of the recessed portion of the intermediate sleeve.

2. A hose end unit comprising a length of hose having inner and outer flexible layers and a wire reinforcement between the layers, said outer layer extending beyond the inner layer, an inner non-deformable sleeve within the inner layer, said inner sleeve having radial gripping members at one end and gripping teeth directed radially outwardly therefrom at the opposite end extending toward the hose end, an intermediate sleeve overlying the inner sleeve in engagement with the gripping teeth and having a radially inwardly depressed portion over the gripping teeth, said intermediate sleeve having a recessed portion remote from the depressed portion receiving and clamping the inner layer of the hose between the inner sleeve and the wall of said recessed portion, an outer sleeve surrounding the outer hose layer and extending axially above the intermediate sleeve over substantially its entire length and sharp edged screw thread-like gripping teeth on said outer sleeve extending radially inwardly above the depressed portion on the intermediate sleeve, engaging the reinforcing wire directly between said teeth and the depressed portion of the intermediate sleeve and exerting pressure on the outer layer and intermediate sleeve deforming the reinforcing wire into the depressed portion of the intermediate sleeve and clamping the inner flexible layer between the inner sleeve and the wall of the recessed portion of the intermediate sleeve.

3. A hose end unit comprising a length of hose having inner and outer flexible layers and a wire reinforcement between the layers, said outer layer extending beyond the inner layer, an inner sleeve within the inner layer, said inner sleeve having radial gripping members at one end and gripping teeth directed radially outwardly therefrom at the other end and extending toward the hose end, an intermediate sleeve overlying the inner sleeve in engagement with the gripping teeth and having a radially inwardly depressed portion over the gripping teeth, said intermediate sleeve having a recessed portion remote from the depressed portion receiving and clamping the inner layer of the hose between the inner sleeve and the wall of said recessed portion, an outer liner surrounding the outer hose layer and extending axially above the intermediate sleeve over substantially its entire length, sharp edged screw thread-like gripping teeth on said liner extending radially inwardly above the depressed portion of the intermediate sleeve engaging the reinforcing wire directly between said teeth and the depressed portion of the intermediate sleeve and exerting pressure on the outer layer and intermediate sleeve deforming the reinforcing wire into the depressed portion of the intermediate sleeve and clamping the inner flexible layer between the inner sleeve and the wall of the recessed portion of the intermediate sleeve, and an outer sleeve surrounding the outer liner over its entire length and retaining the outer liner under compression.

4. A hose end unit comprising a length of hose having inner and outer flexible layers and a wire reinforcement between the layers, said outer layer extending beyond the inner layer, an inner non-deformable sleeve within the inner layer, said inner sleeve having radial-gripping members thereon, an intermediate sleeve overlying the inner sleeve in contact therewith and fixed thereto at one end portion, said intermediate sleeve having a radially inwardly depressed portion in said one end portion, said inner sleeve having at the end remote from said depressed portion a recessed portion receiving and clamping the inner flexible layer of the hose between the inner sleeve and wall of said recessed portion, an outer sleeve surrounding the outer hose layer and extending axially above the intermediate sleeve over substantially its entire length and sharp edged screw thread-like teeth extending radially inwardly from the outer sleeve above the depressed portion of the intermediate sleeve engaging the reinforcing wire directly between said teeth and the intermediate sleeve and exerting pressure on the outer layer and intermediate sleeve deforming the reinforcing wire into the depressed portion of the intermediate sleeve and clamping the inner flexible layer between the sleeve and the wall of the recessed portion of the intermediate sleeve.

References Cited in the file of this patent

UNITED STATES PATENTS

| 1,808,094 | Yackey | June 2, 1931 |
| 1,924,712 | Eisenman | Aug. 29, 1933 |
| 1,985,494 | Gish | Dec. 25, 1934 |
| 2,314,000 | Lusher | Mar. 16, 1943 |
| 2,371,971 | Main et al. | Mar. 20, 1945 |
| 2,431,522 | Trevaskis | Nov. 25, 1947 |
| 2,452,728 | Carling | Nov. 2, 1948 |
| 2,463,293 | Mentel | Mar. 1, 1949 |

FOREIGN PATENTS

| 610,426 | Great Britain | Oct. 15, 1948 |
| 640,140 | Great Britain | July 12, 1950 |